(12) United States Patent
Leum

(10) Patent No.: US 9,428,350 B2
(45) Date of Patent: Aug. 30, 2016

(54) MOBILE LOADING DOCK WITH FREE FALL PROTECTION

(71) Applicant: Grant Leum, Excelsior, MN (US)

(72) Inventor: Grant Leum, Excelsior, MN (US)

(*) Notice: Subject to any disclaimer, the term of this patent is extended or adjusted under 35 U.S.C. 154(b) by 0 days.

(21) Appl. No.: 14/976,886

(22) Filed: Dec. 21, 2015

(65) Prior Publication Data

US 2016/0107851 A1 Apr. 21, 2016

Related U.S. Application Data

(63) Continuation-in-part of application No. 14/885,537, filed on Oct. 16, 2015, now Pat. No. 9,254,971, which is a continuation of application No. 13/903,207, filed on May 28, 2013, now Pat. No. 9,169,090.

(51) Int. Cl.
*E01D 15/00* (2006.01)
*B65G 69/30* (2006.01)
*E01D 15/12* (2006.01)
*E01D 15/127* (2006.01)

(52) U.S. Cl.
CPC ............. *B65G 69/30* (2013.01); *E01D 15/12* (2013.01); *E01D 15/127* (2013.01)

(58) Field of Classification Search
CPC ................................ B65G 69/30; E01D 15/12
USPC ........................................ 14/69.5, 71.1, 71.3
See application file for complete search history.

(56) References Cited

U.S. PATENT DOCUMENTS

| | | |
|---|---|---|
| 3,261,489 A | 7/1966 | Miles |
| 3,548,433 A | 12/1970 | Miles |
| 3,802,018 A | 4/1974 | Miles |
| 4,624,446 A | 11/1986 | Gould |
| 4,765,792 A | 8/1988 | Cherry et al. |
| 5,311,628 A | 5/1994 | Springer et al. |
| 5,845,356 A | 12/1998 | Kielinski |
| 6,931,686 B2 | 8/2005 | Hoofard et al. |
| 7,013,519 B2 | 3/2006 | Gleason |
| 7,062,813 B2 | 6/2006 | Hoofard |
| 7,134,159 B2 * | 11/2006 | Muhl ................. B65G 69/2894 14/71.1 |
| 7,216,392 B2 | 5/2007 | Hoofard et al. |
| 2004/0250360 A1 * | 12/2004 | Young .................... B65G 69/30 14/69.5 |
| 2009/0178214 A1 * | 7/2009 | Gang .................... B65G 69/30 14/69.5 |

OTHER PUBLICATIONS

Amitengineering. Movable Dock Ramp. YouTube, published on Nov. 2, 2012; Retrieved form the Internet on May 9, 2014, URL: http://www.youtube.com/watch?v=NPPd90-8a1g.

Leumengineering. Mobile Loading Dock—How It Works. YouTube, published on Jun. 14, 2013; Retrieved from the Internet on May 9, 2014, URL: https://www.youtube.com/watch?v=kyvwWLhSQqo.

* cited by examiner

*Primary Examiner* — Raymond W Addie
(74) *Attorney, Agent, or Firm* — Jansson Munger McKinley & Kirby Ltd.

(57) ABSTRACT

A mobile loading dock including a planar ramp member having a lower end and an upper end including an upper edge having a lip, the lip resting on a trailer bed. A ramp underside including a wheel assembly thereupon, the wheel assembly having a hydraulic member, a leg hingedly attached to the ramp underside; a wheel attached to the leg at an axle and disposed to contact a ground surface beneath the mobile loading dock and a hydraulic velocity fuse. If the trailer bed moves while the lip is resting on the trailer bed the hydraulic velocity fuse engages and prevents free fall of the ramp member to the ground.

9 Claims, 13 Drawing Sheets

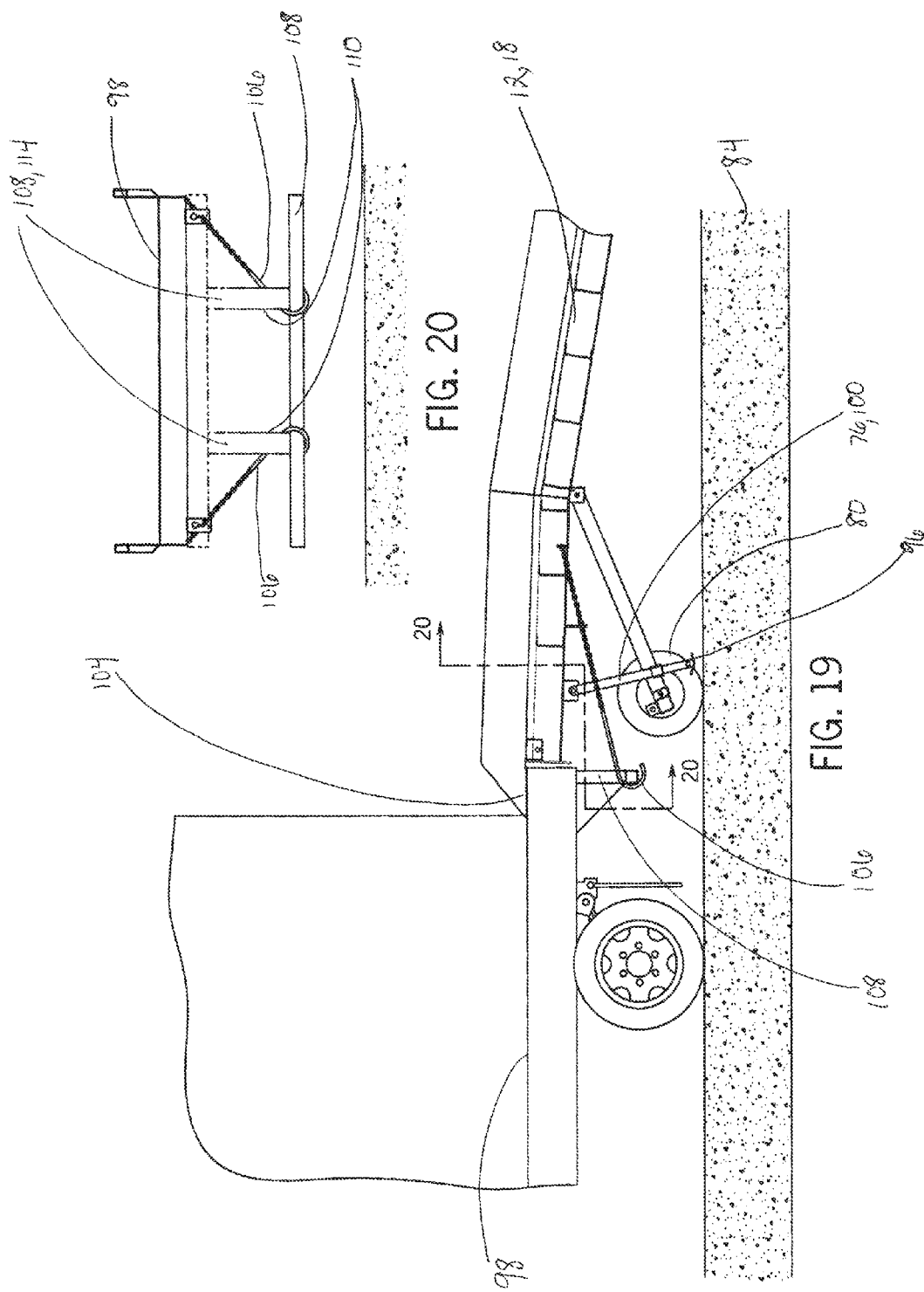

MOBILE LOADING DOCK WITH FREE FALL PROTECTION

RELATED APPLICATION

The present application is a continuation-in-part of pending U.S. patent application Ser. No. 14/885,537, filed Oct. 16, 2015 and U.S. patent application Ser. No. 14/885,537 is a continuation of U.S. patent application Ser. No. 13/903,207 filed on May 28, 2013, the contents of both of which are incorporated by reference in their entireties.

FIELD

This device relates to a mobile loading dock ramp and more particularly to a loading dock with a hydraulic flow control valve for free fall protection.

BACKGROUND

A variety of mobile loading dock ramps have been devised with different safety measure considerations. Most loading dock ramps of the prior art have at least a portion of the upper ramp resting on the bed of a trailer as it is loaded or unloaded. This practice can be hazardous since a truck may pull away with the upper edge of the ramp still resting on the trailer causing the ramp and materials on the ramp to fall downward to the ground.

There are many such ramp devices in the prior art which do not have safety features to prevent the ramp from falling to the ground should the vehicle being loaded or unloaded suddenly pull away or jerk slightly. One such device is seen in U.S. Pat. No. 6,746,068 (Hurd) which discloses a ramp placed onto the bed of a truck. There are no safety features present on such ramp should the truck pull away while loading or unloading is taking place.

Loading dock ramps of the prior art typically have certain disadvantages such as the lack of safety features noted above. It would be desirable to have a mobile loading dock ramp which is secure and safe and which would not fall and hit the ground if the vehicle being unloaded suddenly or mistakenly moved away from the ramp. This device overcomes this problem by providing a ground support leg as well as a hydraulic flow control valve and safety chains.

This device overcomes certain problems and shortcomings in the prior art, including those mentioned above and others, and provides advantages for a mobile loading dock ramp not previously provided.

SUMMARY

This device is an improvement in a mobile loading dock apparatus of the type including a planar ramp member having a lower end terminating in a lower edge, an upper end including an upper edge having a lip, the lip resting on a trailer bed. The ramp underside has a wheel assembly, the wheel assembly includes a hydraulic member, a leg hingedly attached to the ramp underside and a wheel attached to the leg at an axle and disposed to contact a ground surface beneath the mobile loading dock. The dock also includes a hydraulic velocity fuse. If the trailer bed moves while the lip is resting on the trailer bed so that the trailer bed and lip become disengaged the hydraulic velocity fuse engages and prevents free fall of the ramp member to the ground.

It is highly preferred that the hydraulic member is a hydraulic cylinder and the hydraulic velocity fuse is attached to the hydraulic cylinder. In such highly preferred embodiments, unsupported weight of the ramp member will cause flow in the hydraulic cylinder to exceed the velocity fuse rating causing a hydraulic release valve to close and the hydraulic cylinder to be rigid thereby preventing free fall of the ramp member.

Preferably, the wheel assembly further includes a tension spring. It is also preferable that the tension spring exerts a pulling force on the leg and the wheel and the hydraulic member exerts a pushing force on the leg and the wheel, the combined pulling force and pushing force being directionally disposed to erect the wheel assembly when the lower end of the mobile loading dock is raised from a resting position in contact with the ground surface to a mobile position not in contact with the ground surface.

In some preferred embodiments, the wheel assembly further includes an elongate weight-bearing support member having a first end attached to the ramp underside and a second end attached to the tension spring and having a foot. The foot contacts the ground surface when the wheel assembly is in the resting position and the support member bears a portion of the weight of the ramp member. It is highly preferred that the ramp member include two wheel assemblies which are equally distant from a point on the lower edge.

Highly preferred embodiments include a pair of rig hooks which hook onto trailer impact guards on the back end of a truck and act as a secondary securement device thereby preventing the truck from pulling away from the ramp during loading or unloading. Preferably, the rig hooks wrap onto and around an inside portion of the trailer impact guards.

The mobile loading dock includes a lower end terminating in a lower edge and an upper end including an upper edge. In some embodiments, the lower edge has a slot substantially parallel to the length of the ramp member for engagement with a slot-engaging member. The slot-engaging member is able to be connected to a fork truck for positioning of the ramp member.

In some preferred embodiments, a fork-engaging sleeve is used to position the ramp member. Preferably, the fork-engaging sleeve has an underside from which the slot-engaging member protrudes downward. The slot-engaging member includes a downward-protruding rod portion and a flange-end portion connected thereto.

Preferably, the slot includes a first portion and a second portion. The first portion guides the slot-engaging member toward the second portion wherein the slot-engaging member is securable. It is also preferred that the second portion include an arc-shaped member affixed to an underside of the ramp member for receiving the flange-end portion. It is highly preferable that the flange-end portion include a tapered-upward-facing surface for contact and securement with the arc-shaped member when connecting the fork truck to the loading dock.

In preferred embodiments, the arc-shaped member includes a concave-interior surface for securement of the slot-engaging member and for interaction with the tapered-upward-facing surface thereby enabling movement of the ramp member.

In highly preferred embodiments, the fork truck includes at least one fork and the fork-engaging sleeve includes at least one sheath for receiving the fork. In other highly preferred embodiments, the fork-engaging sleeve includes two sheaths, one for each corresponding fork. Another aspect of the device includes a chain for supplementary securement of the fork-engaging sleeve to the fork truck.

It is highly preferable that the ramp member has opposed sidewalls and the lower edge has edge-end corners. Preferably, the sidewalls extend from the upper edge of the ramp member to termination points between the upper edge and the edge-end corners; the distance between the termination points and the edge-end corners is between 12 inches and 60 inches.

It is preferable that the ramp member include (a) a first upper-end planar portion, the plane of which is parallel to a ground surface on which the ramp member rests; and (b) a second planar portion, the plane of which is downwardly-angled from the upper end to the lower edge. Some embodiments also include a hand-rail secured to the first upper-end planar portion.

It is highly preferred that the mobile loading dock includes a ramp underside with a wheel assembly. In preferred embodiments, the wheel assembly includes a tension spring, a hydraulic member, a leg hingedly attached to the ramp underside and a wheel attached to a leg at an axle and disposed to contact the ground surface beneath the mobile loading dock.

In operation, the tension spring exerts a pulling force on the leg and wheel and the hydraulic member simultaneously exerts a pushing force on the leg and wheel. The combined pulling force and pushing force are directionally disposed to erect the wheel assembly when the lower end of the mobile loading dock is raised from a resting position in contact with the ground surface to a mobile position not in contact with the ground surface.

Preferably, the wheel assembly includes a hydraulic check valve for automatic locking of the wheel assembly into a mobile position when the wheel assembly is erected. The wheel assembly also preferably includes a manually-actuated hydraulic release valve. Actuation of the release valve while in the mobile position causes the pushing force to be reduced and the wheel assembly to return to the resting position.

It is preferred that the wheel assembly also include an elongate weight-bearing support member having a first end attached to the ramp underside and a second end attached to a tension spring and having a foot. The foot contacts the ground surface when the wheel assembly is in the resting position. When in the resting position, the support member bears a portion of the weight of the ramp member.

It is highly preferred that the ramp member include two wheel assemblies, one on each side of the ramp. The wheel assemblies are equally distant from a point on the lower edge and are located on each side of ramp member to provide stability.

BRIEF DESCRIPTION OF THE DRAWINGS

The drawings illustrate a preferred embodiment including the above-noted characteristics and features of the device. The device will be readily understood from the descriptions and drawings. In the drawings:

FIG. 19 is a perspective view of the upper end of the mobile loading dock of FIG. 17 with rig hooks; and FIG. 20 is a cross sectional view of the mobile loading dock and trailer of FIG. 17 taken along line 20-20.

DETAILED DESCRIPTION OF PREFERRED EMBODIMENTS

Figure 1:
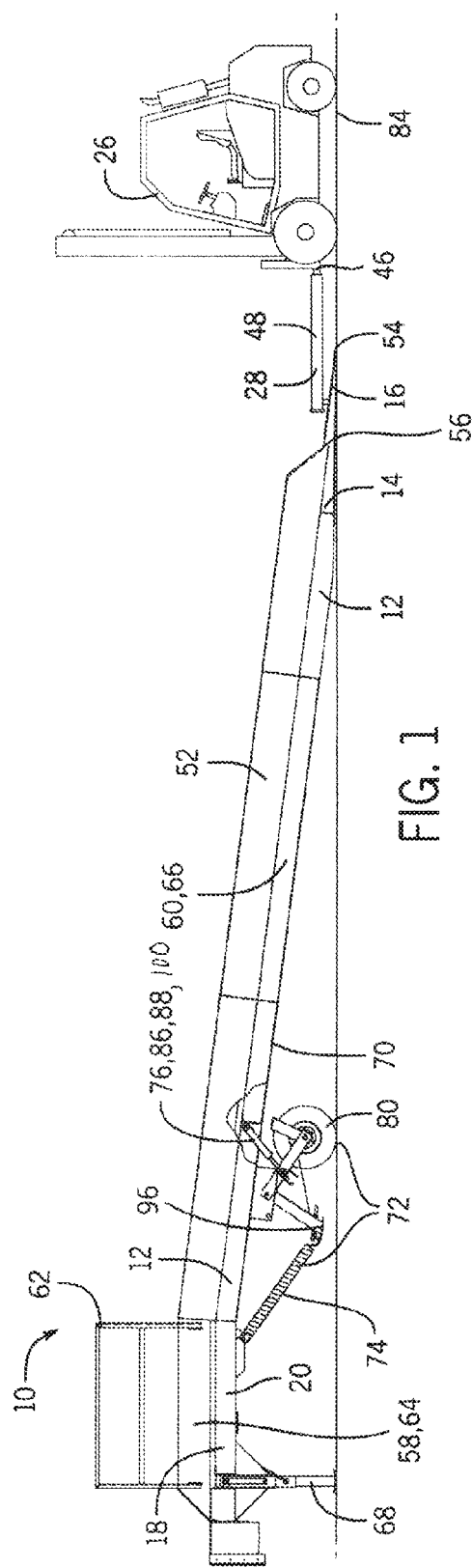
FIG. 1 is a perspective view of the mobile loading dock and fork truck with fork-engaging sleeve.

FIGS. 1-20 illustrate that mobile loading dock (also referred to herein as a "yard ramp" or "ramp") 10 in use is supported by a trailer bed 98 on upper end 18 and the ground 84 on lower end 14. Ramp 10 includes hydraulic members 76 which are hydraulic cylinders 100 used for pushing and holding wheels 80 into position as well as for mobility. Ramp 10 also includes velocity fuse 102 also referred to as a hydraulic flow control valve. Velocity fuse 102 includes a hose 116 which connects to hydraulic member 76. Velocity fuse 102 stops the hydraulic flow when the designated flow rate is exceeded. Velocity fuse 102 flow rate is set between the normal "float" rate of motion during the loading process and the excessive flow rate caused should the trailer 98 become separated from lip 104 of ramp member 12 while lip 104 is resting on the bed of trailer 98. If this occurs, ramp member 12 becomes unsupported and will free fall to ground 84. This is prevented in the present application due to velocity fuse 102 on mobile loading dock 10.

Figure 17:
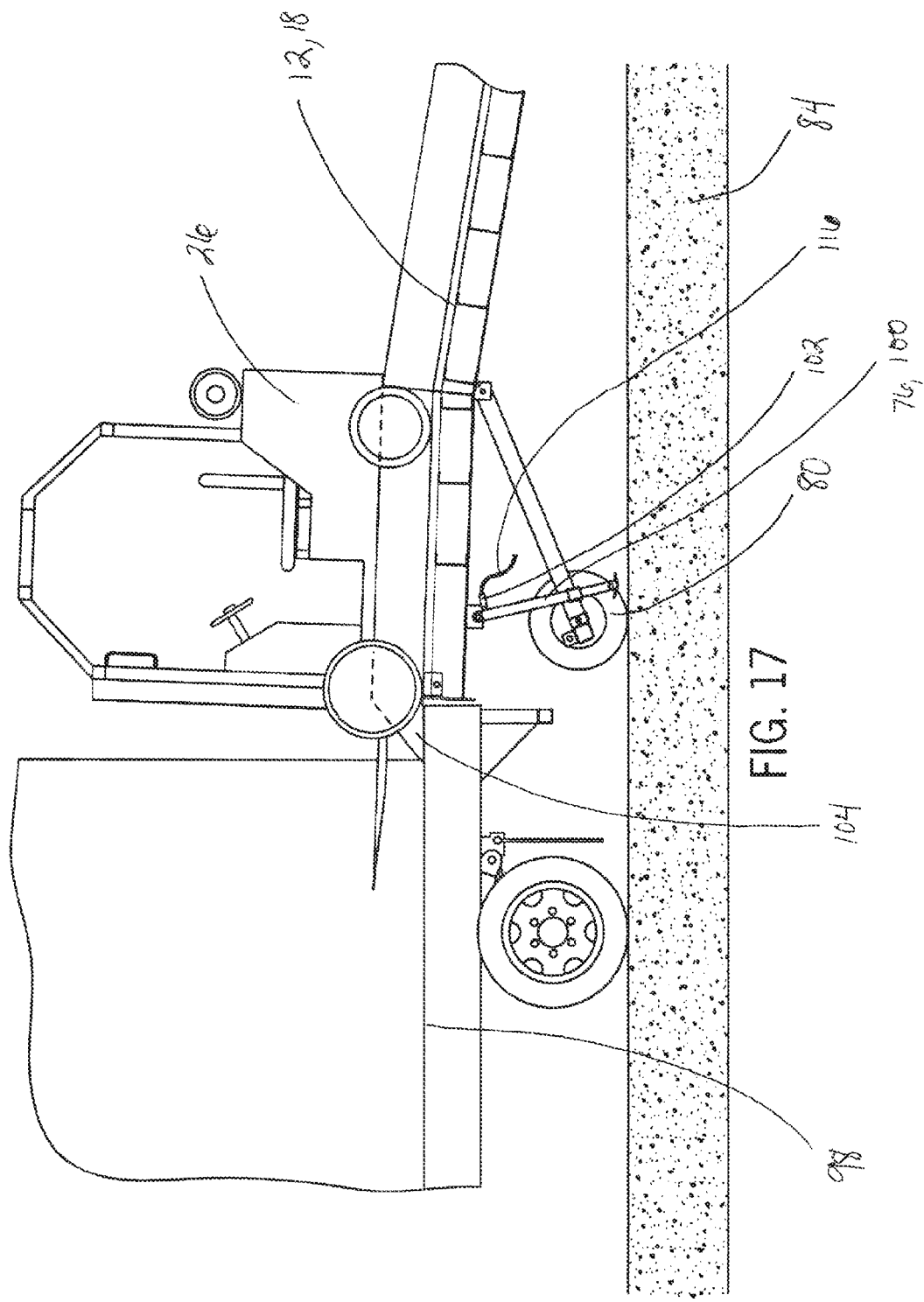
FIG. 17 is a perspective view of the upper end of the mobile loading dock of FIG. 1 with the ramp lip contacting the trailer bed.
Figure 18:
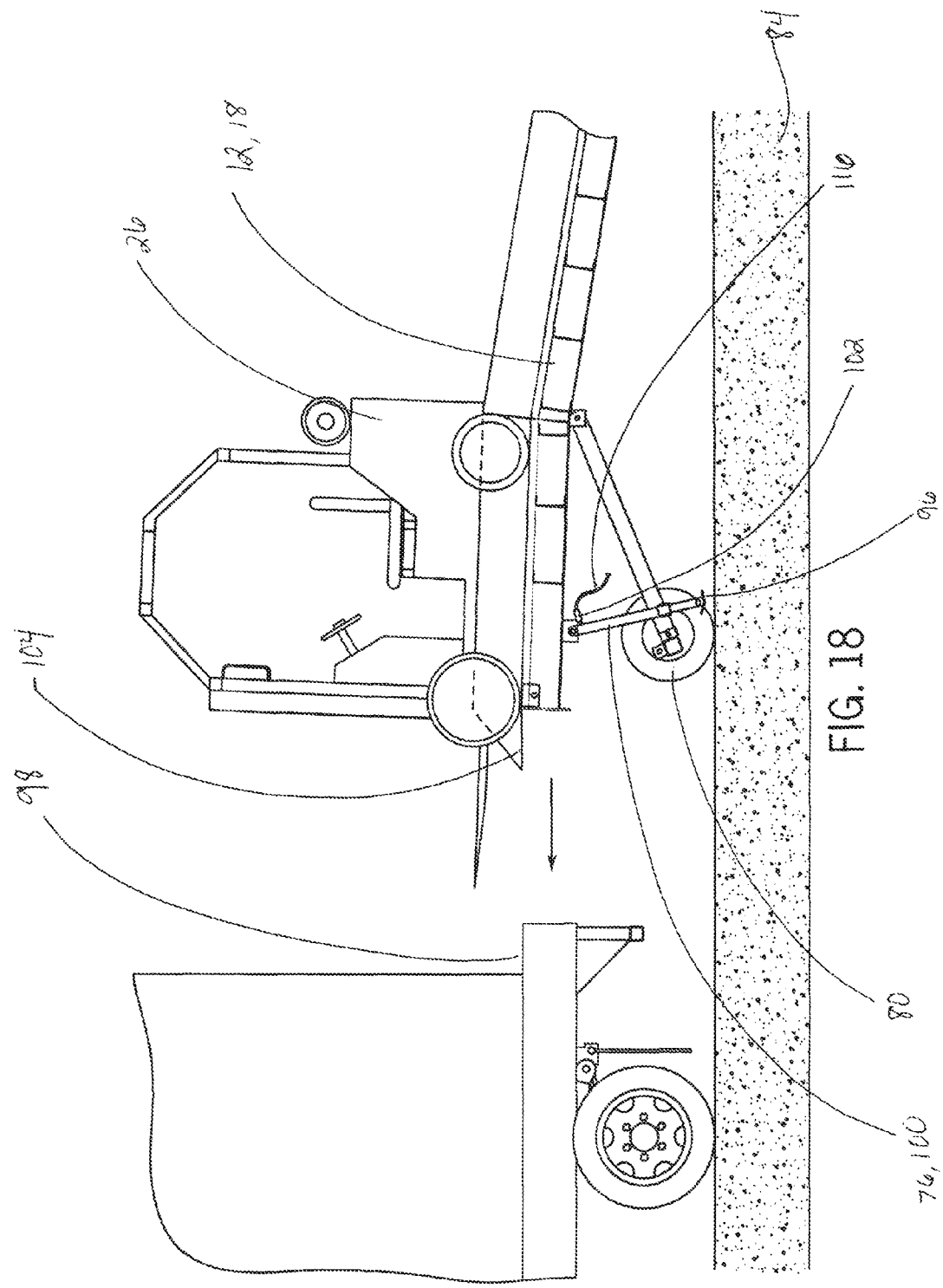
FIG. 18 is a perspective view of the upper end of the mobile loading dock of FIG. 17.

As seen in FIGS. 17-19, velocity fuse 102, in conjunction with the forward location of wheels 80 and hydraulic cylinders 100, create a support structure to resist the vertical loads of ramp member 12 as well as fork truck 26 and fork truck operator should the trailer 98 pull away from ramp member 12 while loading or unloading is in process. This greatly increases the safety of use of ramp member 12 that is otherwise only supported by lip 104.

FIGS. 19 and 20 illustrate that a secondary safety feature present on ramp member 12 is at least one but preferably a pair of rig hooks 106. The typical method for connection of a hook from a ramp to a trailer is to have an employee crawl under the ramp structure to wrap an open-ended chain around the rear impact guard 108 on a trailer 98. In the present application, rig hooks 106 include a hook-shaped steel piece attached to a chain that can hook around the uprights 114 on trailer 98 as well as rear impact guard 108 on trailer as seen in FIGS. 19-20. This provides a positive connection between ramp member 12 and trailer 98 without requiring an operator to physically crawl under ramp member 12 which can be dangerous. Chain length on rig hooks 106 can be sized to engage trailer 98 so that its longest length is less than the lip 104 length on ramp member 12 so that separation between ramp member 12 and trailer 98 is not possible if rig hooks 106 are in place.

FIGS. 1-20 illustrate that mobile loading dock 10 includes planar ramp member 12 which has lower end 14 terminating in lower edge 16, and upper end 18 includes upper edge 20 which has lip 104. Lip 104 rests on trailer bed 98. Ramp member 12 includes underside 30 having wheel assembly 72. Wheel assembly includes hydraulic member 76; leg 78 hingedly attached to ramp underside 30; and wheel 82 attached to leg 78 at axle 82 and disposed to contact a ground surface 84 beneath mobile loading dock 10. Ramp member 12 includes hydraulic velocity fuse 102. If trailer bed moves while lip 104 is resting on trailer bed 98 hydraulic velocity fuse 102 engages and prevents free fall of ramp member 12 to the ground 84.

Hydraulic member 76 is a hydraulic cylinder 100 and hydraulic velocity fuse 102 is attached to hydraulic cylinder 100 as seen best in FIGS. 17-18. Unsupported weight of ramp member 12 will cause flow in hydraulic cylinder 100 to exceed velocity fuse 102 rating causing hydraulic release valve 88 to close and hydraulic cylinder 100 to be rigid thereby preventing free fall of ramp member 12.

FIGS. 19-20 illustrate that mobile loading dock 10 includes a pair of rig hooks 106 which hook onto trailer impact guards 108 on truck and act as a secondary securement device thereby preventing the truck from pulling away from dock 10 during loading or unloading. Rig hooks 106 are secured by wrapping them onto and around inside portion 110 of trailer impact guards 108.

FIGS. 1-16 illustrate a mobile loading dock 10 with planar ramp member 12. Mobile loading dock 10 includes a lower end 14 terminating in a lower edge 16 and an upper end 18 having an upper edge 20. Lower edge 16 has a slot 22 substantially parallel to the length of the ramp member for engagement with a slot-engaging member 24. Slot-engaging member 24 is able to be connected to a fork truck 26 for positioning of ramp member 12.

FIG. 1 illustrates fork truck 26 connected to ramp member 12 via a fork-engaging sleeve 28. Fork-engaging sleeve 28 is used to position ramp member 12. FIGS. 4-8 illustrate that Fork-engaging sleeve 28 has an underside 30 from which slot-engaging member 24 protrudes downward. Slot-engaging member 24 includes two parts, a downward-protruding rod portion 32 and a flange-end portion 34 as seen in FIGS. 4-9.

Figure 2:
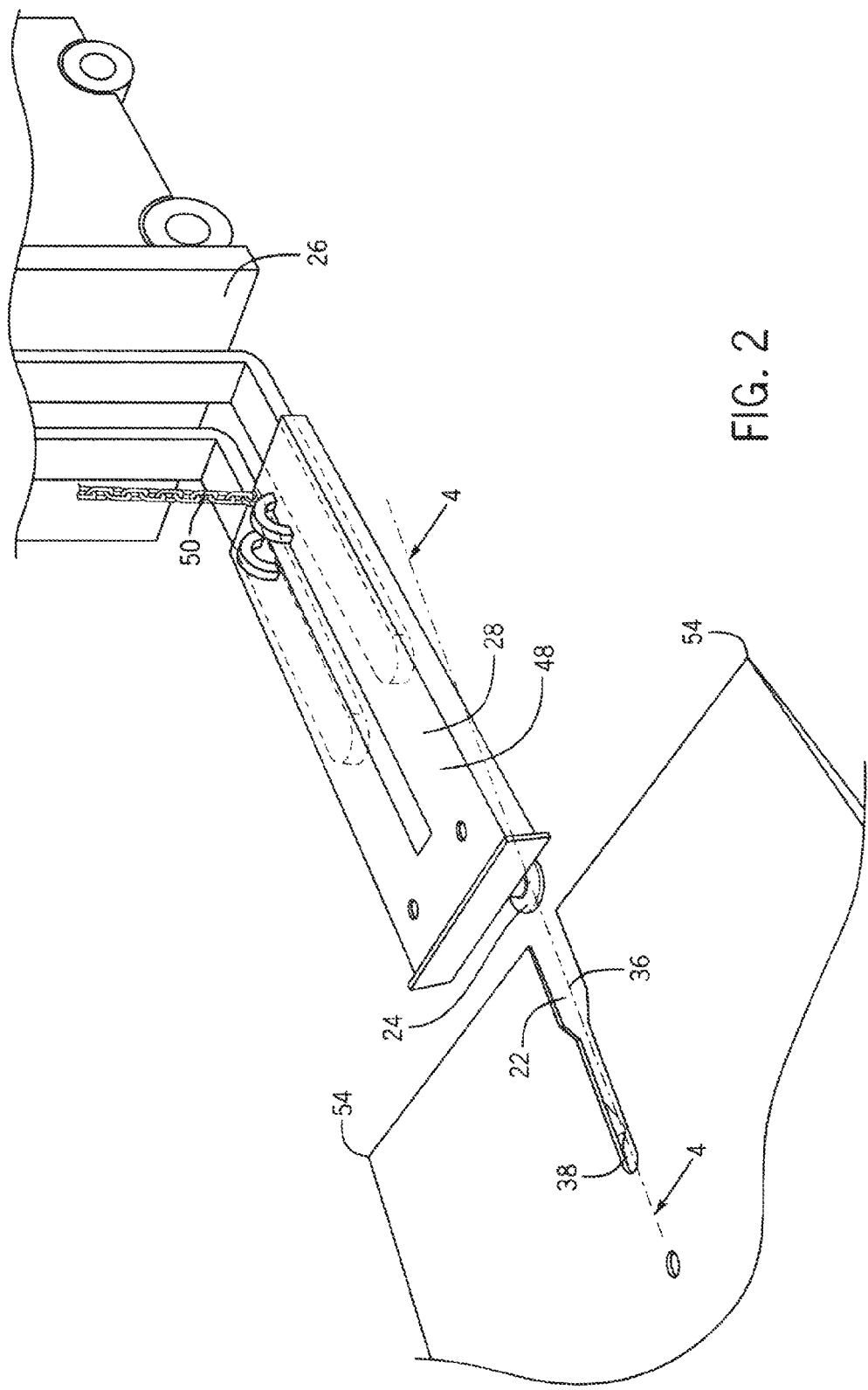
FIG. 2 is a perspective view of the fork-engaging sleeve of FIG. 1.

As illustrated in FIG. 2, slot 22 includes a first portion 36 and a second portion 38. First portion 36 guides slot-engaging member 24 toward the second portion 38. Slot-engaging member 24 is secured in second portion 38. Second portion 38 includes an arc-shaped member 40 affixed to the underside 30 of ramp member 12 for receiving the flange-end portion 34 of slot-engaging member. Flange-end portion 34 include a tapered-upward-facing surface 42. Arc-shaped member 40 includes a concave-interior surface 44 (as seen best in FIG. 10) for securement of slot-engaging member 24 and for interaction with tapered-upward-facing surface 42 thereby enabling movement of ramp member 12.

It is the interaction between flange-end portion 34 (specifically the tapered-upward-facing surface 42) and arc-shaped member 40 that secures ramp member 12 with fork truck 26 and allows fork truck 26 to move and position the ramp member 12.

Figure 3:
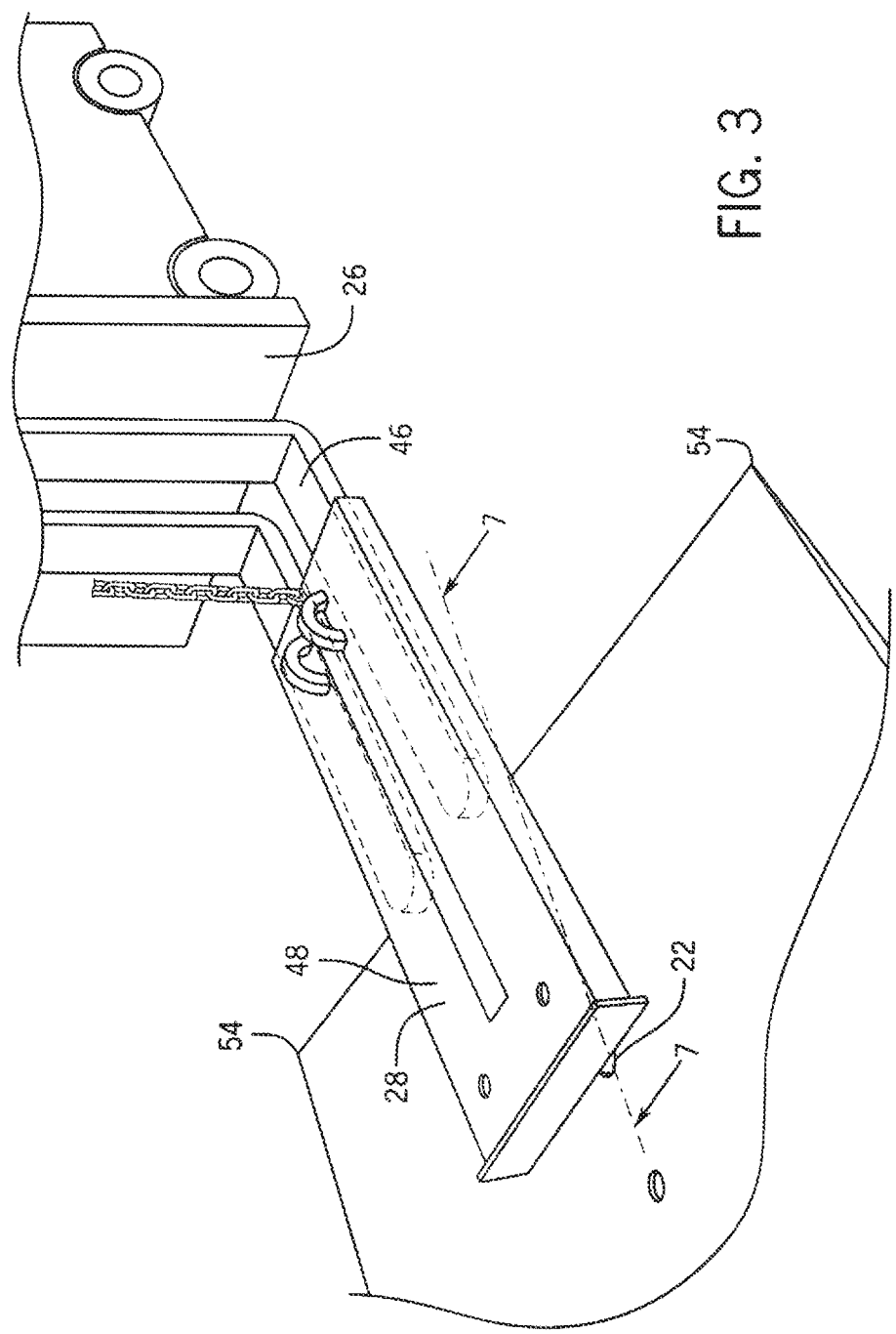
FIG. 3 is a perspective view of the fork-engaging sleeve engaged with the loading dock of FIG. 1.
Figure 4:
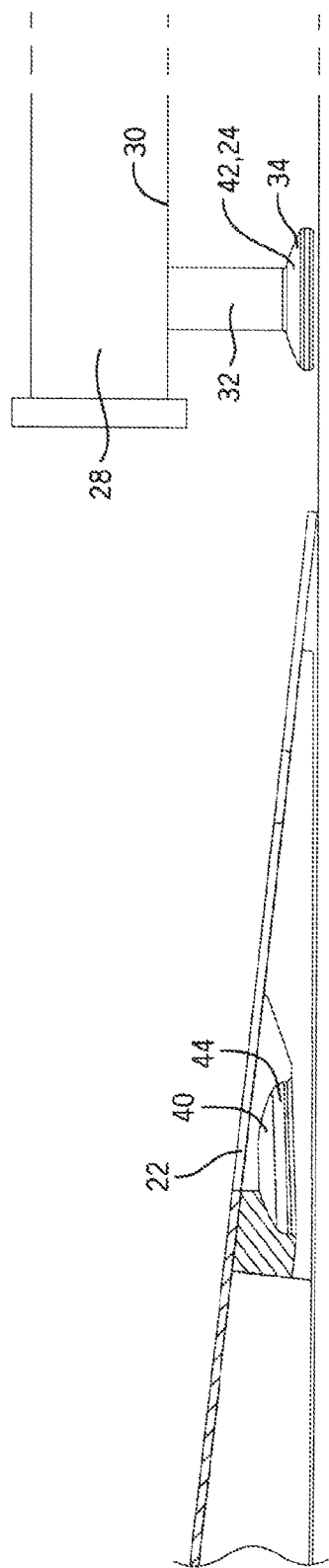
FIG. 4 is a cross sectional view of the mobile loading dock and fork-engaging sleeve of FIG. 2 taken along line 4-4.
Figure 5:
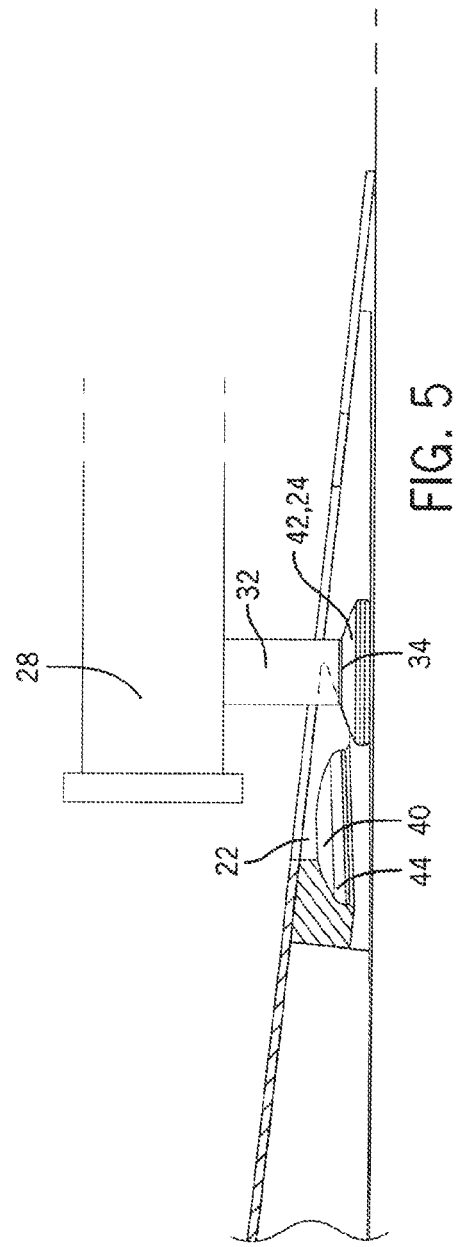
FIG. 5 is a cross-sectional view of the fork-engaging sleeve partially engaged with the loading dock of FIG. 1.
Figure 6:
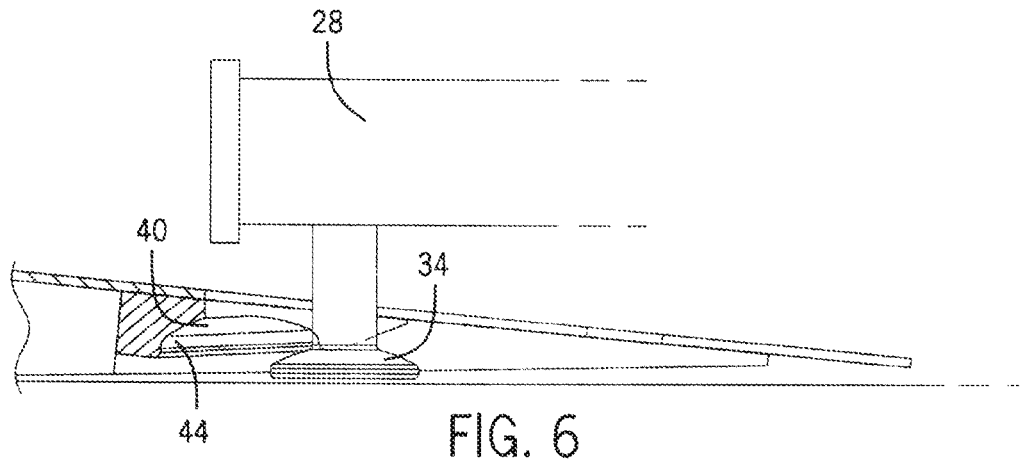
FIG. 6 is a cross-sectional view of the fork-engaging sleeve partially engaged with the loading dock of FIG. 1.
Figure 7:
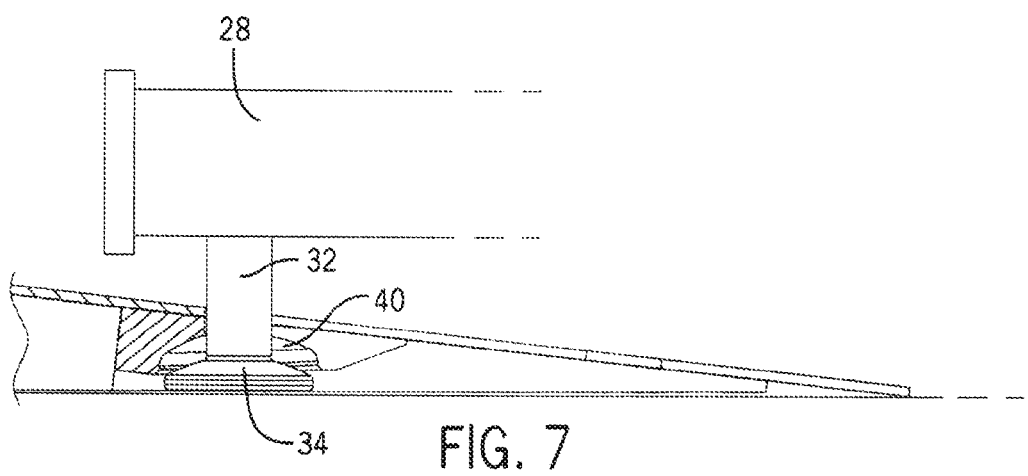
FIG. 7 is a cross-sectional view of the mobile loading dock and fork-engaging sleeve of FIG. 3 taken along line 7-7.
Figure 8:
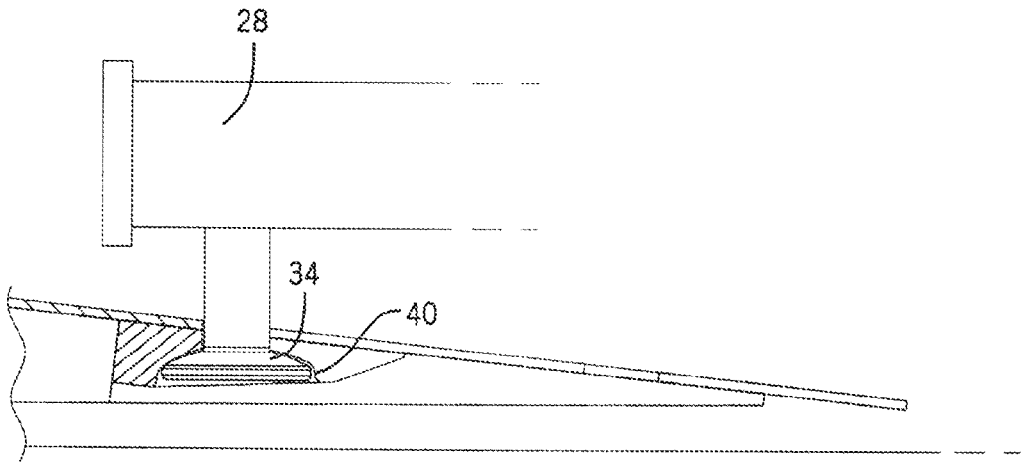
FIG. 8 is a cross-sectional view of the fork-engaging sleeve fully engaged with the loading dock of FIG. 1.
Figure 9:
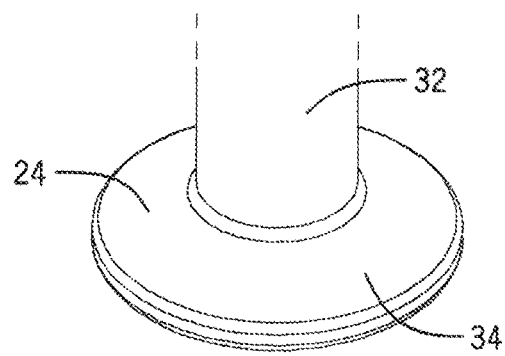
FIG. 9 is a perspective view of the slot-engaging member.
Figure 10:
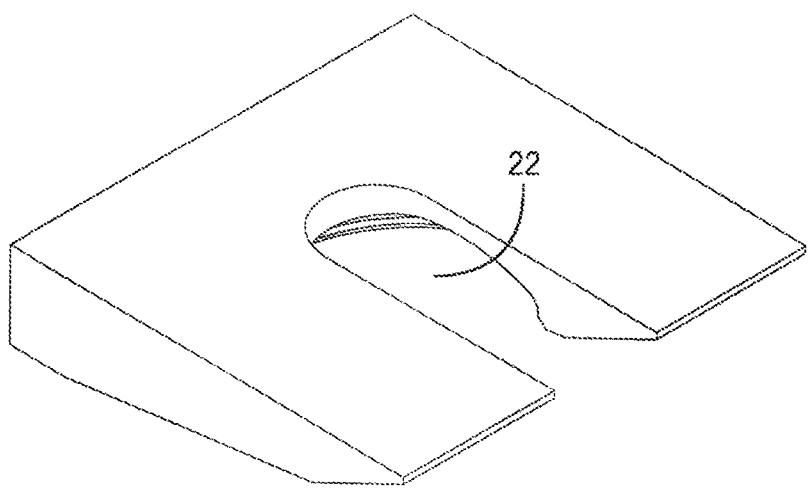
FIG. 10 is a perspective view of the arc-shaped member.
Figure 11:
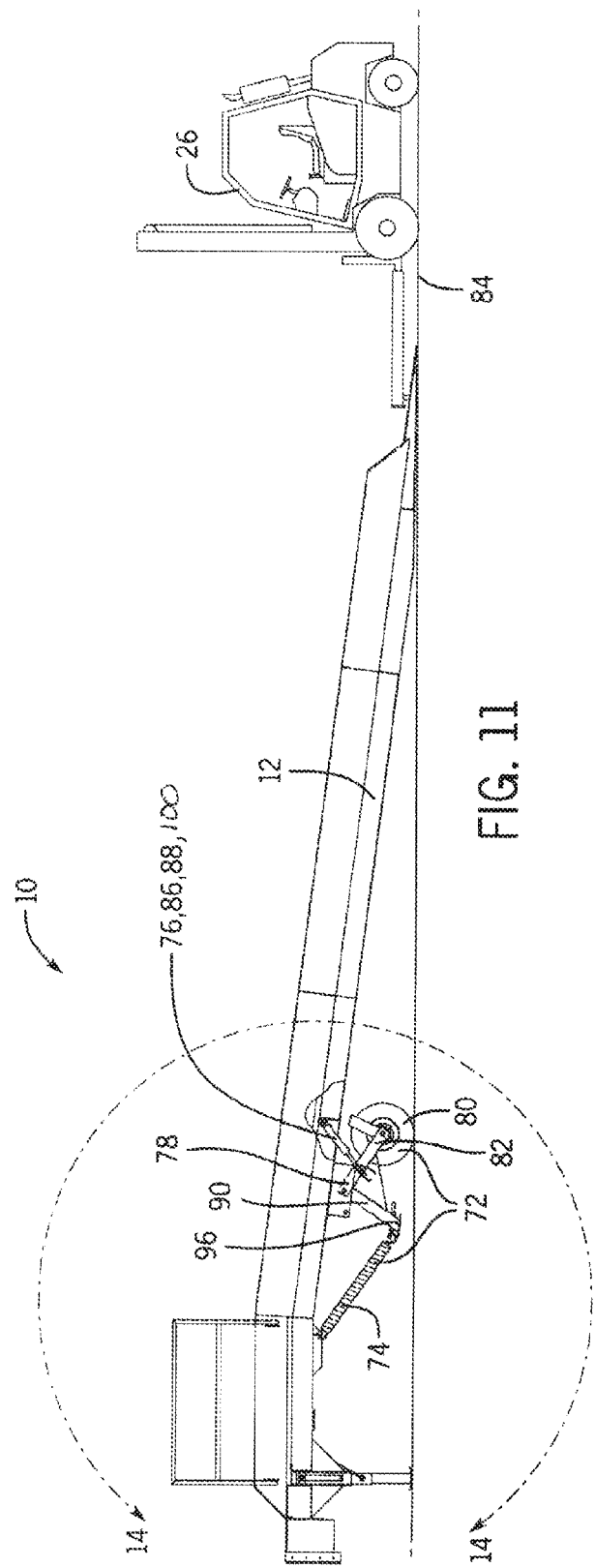
FIG. 11 is a perspective view of the mobile loading dock and fork truck of FIG. 1.

Fork truck 26 includes at least one fork 46 and preferably two forks 46 as seen in FIGS. 2-3. As also illustrated in FIGS. 2-3, fork-engaging sleeve 28 includes at least one sheath 48 for receiving one fork 46 or two connected sheaths 48 if there are two forks 46. Sheath 48 slides on to the fork(s) 46 and is held in place through frictional engagement. A chain 50 can be used for supplementary securement of fork-engaging sleeve 28 to fork truck 26 as seen in FIGS. 2-3.

FIGS. 1 and 11-13 illustrate that ramp member 12 has opposed sidewalls 52 that run the majority of the length of ramp member 12. Lower edge 16 of ramp member 12 has edge-end corners 54. (See FIG. 1.) The edge-end corners 54 are located at the end of ramp member 12. Sidewalls 52 on ramp member 12 extend from upper edge 18 to termination points 56. Termination points 56, as seen in FIG. 1, are located between 20 upper edge of ramp member 12 and edge-end corners 54. The distance between termination points 56 and the edge-end corners 54 is between 12 inches and 60 inches.

Ramp member 12 has several different planes as seen in FIGS. 1 and 11-13. These include a first upper-end planar portion 58, the plane 64 of which is parallel to a ground surface on which ramp member 12 rests; and a second planar portion 60, the plane 66 of which is downwardly-angled from upper end 18 to lower edge 16. Some embodiments of ramp member 12 also include a hand-rail 62 secured to first upper-end planar portion 58 as seen in FIG. 1. First upper-end planar portion 58 is the section of ramp member 12 which, when in use, abuts either a loading dock or vehicle for purposes of loading or unloading.

Typically loading docks include a raised dock for the loading and unloading of materials which often come in large quantities and are carried by wooden pallets. Most docks have doorways with overhead doors that provide access to a garage or similar type of building.

FIG. 1 also illustrates that ramp member 12 includes hand-rails 68 which do not articulate but which assist in supporting the weight of the fork truck 26 so that personnel and material handling equipment (such as a fork truck 26), can conveniently move between the loading dock and the truck bed. A manual hand crank is traditionally used to raise or lower the height of the stationary support members 68.

As also seen in FIG. 1, mobile loading dock 10 includes a ramp underside 70 with a wheel assembly 72. FIGS. 11-16 illustrate that wheel assembly 72 has a tension spring 74, a hydraulic member 76, a leg 78 hingedly attached to the ramp underside 70 and a wheel 80 attached to leg 78 at an axle 82 and disposed to contact a ground surface 84 beneath mobile loading dock 10.

Figure 12:
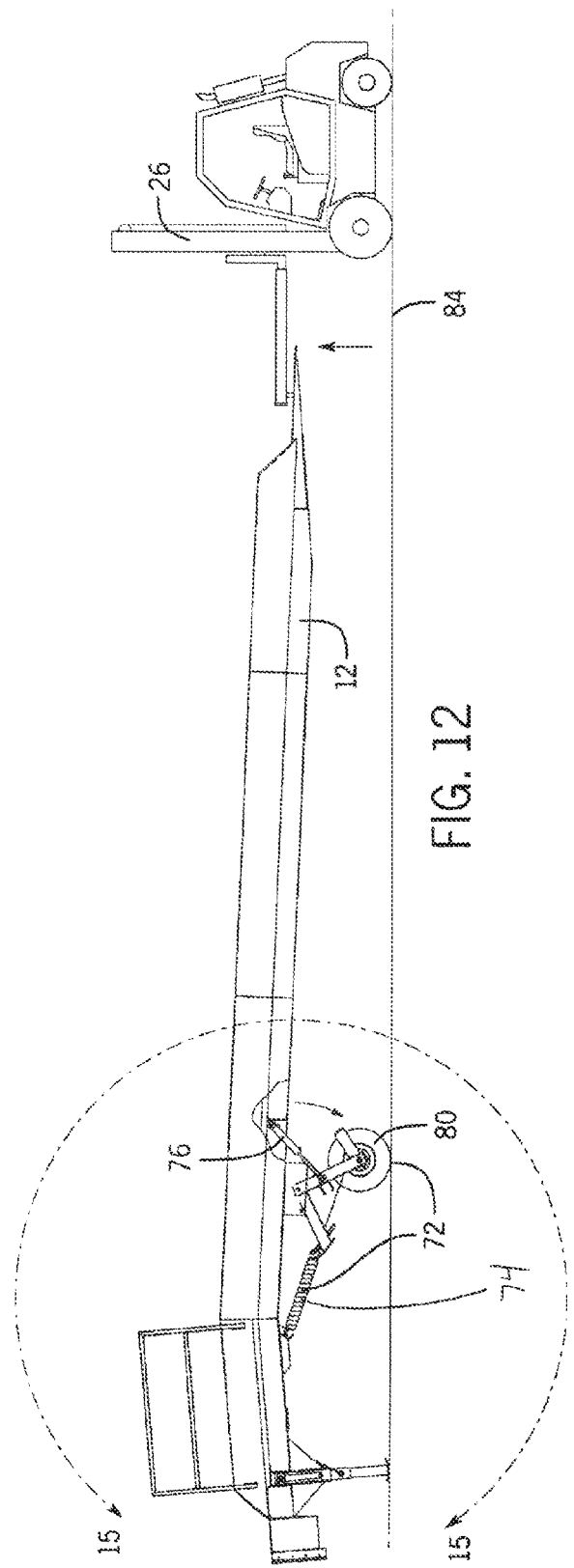
FIG. 12 is a perspective view of the mobile loading dock of FIG. 1 with the ramp member in the raised position.
Figure 13:
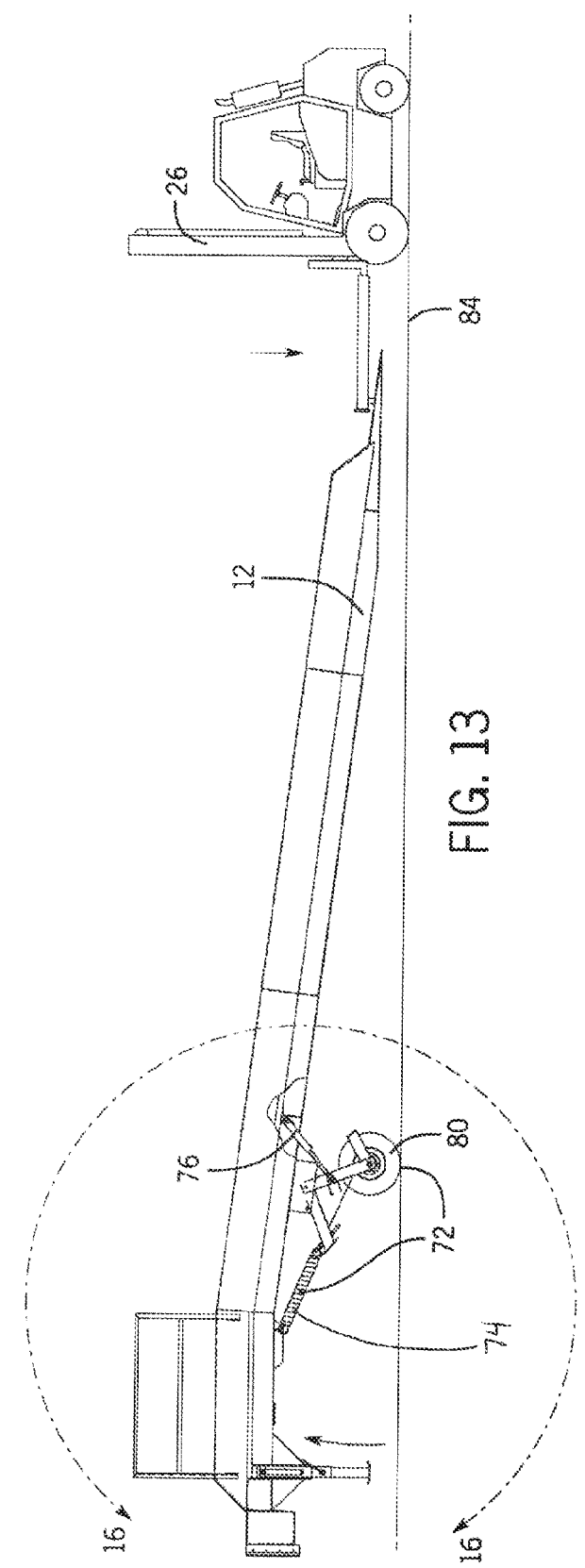
FIG. 13 is a perspective view of the mobile loading dock of FIG. 1 with the ramp member in the lowered position.
Figure 15:
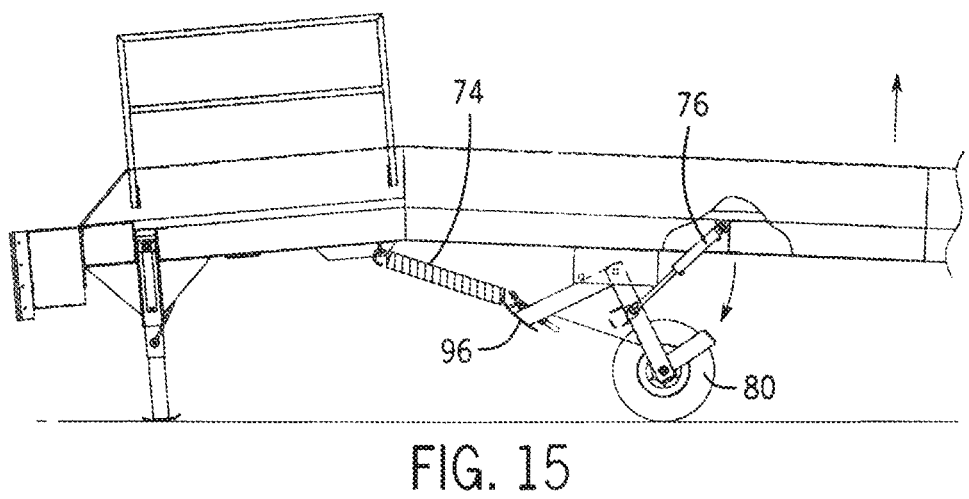
FIG. 15 is a sectional view of the wheel assembly of FIG. 12 taken along line 12-12.

In operation, tension spring 74 exerts a pulling force on leg 78 and wheel 80 and the hydraulic member 76 exerts a pushing force on the leg 78 and wheel 80 as seen by the arrow in FIGS. 12 and 15. The combined pulling force and pushing force are directionally disposed to erect wheel assembly 72 when the lower end 14 of mobile loading dock 10 is raised from a resting position in contact with ground surface 84 (FIGS. 12 and 15) to a mobile position not in contact with ground surface 84.

Wheel assembly 72 includes a hydraulic check valve 86 for automatic locking of wheel assembly 72 into a mobile position when wheel assembly 72 is erected. Wheel assembly 72 also includes a manually-actuated hydraulic release valve 88, actuation of which in the mobile position causes the pushing force to be reduced and wheel assembly 72 to return to the resting position as seen in FIGS. 11, 13-14 and 16.

Figure 14:
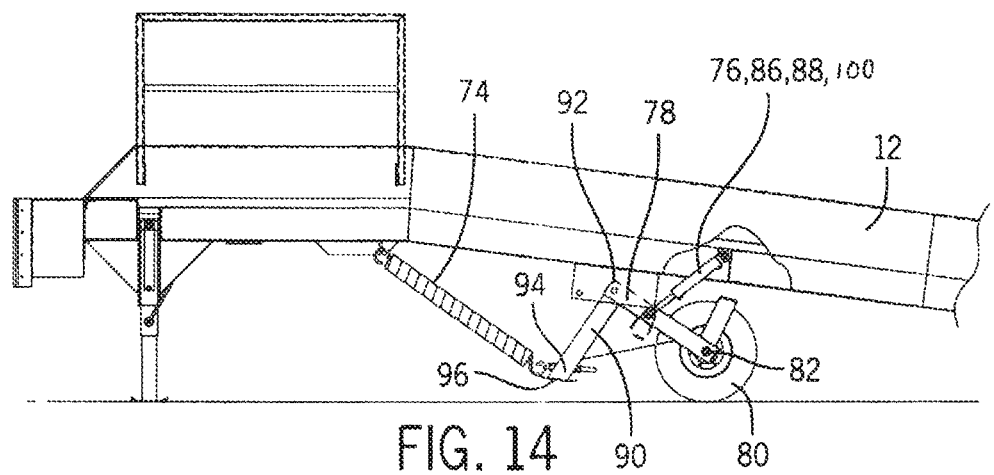
FIG. 14 is a sectional view of the wheel assembly of FIG. 11 taken along line 11-11.
Figure 16:
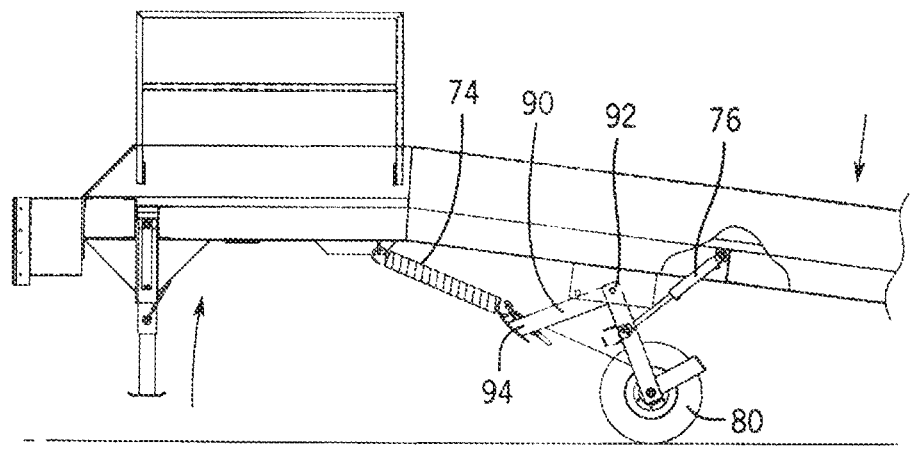
FIG. 16 is a sectional view of the wheel assembly of FIG. 13 taken along line 13-13.

As seen best in FIGS. 14-16, wheel assembly 72 also includes an elongate weight-bearing support member 90 having a first end 92 attached to ramp underside 70 and a second end 94 attached to tension spring 74 and having a foot 96. Foot 96 contacts ground surface 84 when wheel assembly 72 is in the resting position. When in the resting position, support member 90 bears a portion of the weight of ramp member 12.

Ramp member 12 typically includes two wheel assemblies (two not shown) which are equally distant from a point on the lower edge 16 and located on each side of ramp member 12 to provide stability.

In operation, mobile loading dock 10 is moved from a resting to a mobile position by fork truck 26 so that it directly contacts either a dock or a semi-trailer for loading and unloading of material. In order to facilitate movement of mobile loading dock 10, fork truck 26, which already has the fork-engaging sleeve 28 on its forks 46, drives forward towards the lower end 14 of ramp member 12 until slot-engaging member 24 engages slot 22. Fork truck 26 then slowly raises the forks 46 straight up and engages flange-end portion 34 with arc-shaped member 40 thereby securing the connection between the fork truck 26 and the loading dock 10 without the need for manual operation by user. When loading dock 10 is secured to fork truck 26, fork truck 26 can lift up lower end 14 of ramp member 10 and manipulate movement of ramp member 12 in various directions until ramp member 12 is in the desired position.

Fork truck 26 can turn and maneuver loading dock 10 in 90° in either direction given the opposed sidewalls 52 and the corresponding termination points 56. The plurality of possible angles defines a circular arc around lower edge 16 of ramp member 12, the arc subtending an angle greater than 180° and having a center point defined by slot-engaging member 24. Slot-engaging member 24 moving axially within second portion 38 of slot 22 facilitates positional movement of fork truck 26 between any of a plurality of possible angles relative to mobile loading dock 10 in the mobile position and further facilitates fork-truck-driven movement of mobile loading dock 10 in fork-truck-determined directions measurable on an x-axis on the ground surface and a perpendicular y-axis on the ground surface.

As lower end 14 of loading dock 10 is lifted off of the ground 84 into a mobile position, tension spring 74 automatically articulates wheel assembly 72 into the mobile position. Hydraulic member 76 suctions fluid from a tank and a check valve 86 holds hydraulic member 76 in the fully extended position, allowing loading dock 10 to be moved without any human effort on the hydraulic system (no pumping). Fully automatic latching and articulation of loading dock 10 is achieved. Once loading dock 10 is moved into the desired position, loading or unloading of material can begin.

The operator of the fork truck 26 has the ability to pivot the entire loading dock 10 about the wheel assembly 72. When the weight of loading dock 10 is removed as ramp member 12 is lifted, the tension spring 74 will put a force onto the wheel 80, causing the hydraulic member 76 to be mechanically extended as the wheel assembly 72 rotates from the force or tension spring 74. Check valve 86 allows hydraulic fluid to be suctioned from the bottom of a hydraulic tank into cylinders. When fork truck operator lowers the lower end 14, the wheel 80 is moved by the tension spring 74 into position and is held in place by the hydraulic member 76 (specifically a hydraulic cylinder).

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A mobile loading dock comprising a planar ramp member having:
   a lower end terminating in a lower edge;
   an upper end including an upper edge having a lip, the lip resting on a trailer bed and moving in conjunction with the movement of the trailer bed;
   a ramp underside having a wheel assembly thereupon, the wheel assembly having (a) a hydraulic member; (b) a leg hingedly attached to the ramp underside; and (c) a wheel attached to the leg at an axle and disposed to always stay in contact with a ground surface beneath the mobile loading dock; and
   a hydraulic velocity fuse,
   whereby if the trailer bed moves while the lip is resting on the trailer bed the hydraulic velocity fuse engages and prevents free fall of the ramp member to the ground and the wheel provides stability for the ramp if the lip becomes unsupported.

2. The ramp of claim 1 wherein the hydraulic member is a hydraulic cylinder and the hydraulic velocity fuse is attached to the hydraulic cylinder.

3. The ramp of claim 2 wherein unsupported weight of the ramp member will cause flow in the hydraulic cylinder to exceed the velocity fuse rating causing a hydraulic release valve to close and the hydraulic cylinder to be rigid thereby preventing free fall of the ramp member.

4. The mobile loading dock of claim 1 wherein the wheel assembly further includes a tension spring.

5. The ramp of claim 2 wherein the tension spring exerts a pulling force on the leg and the wheel and the hydraulic member exerts a pushing force on the leg and the wheel, the combined pulling force and pushing force being directionally disposed to erect the wheel assembly when the lower end of the mobile loading dock is raised from a resting position in contact with the ground surface to a mobile position not in contact with the ground surface.

6. The mobile loading dock of claim 5 wherein the wheel assembly further includes an elongate weight-bearing support member having a first end attached to the ramp underside and a second end attached to the tension spring and having a foot, the foot contacting the ground surface when the wheel assembly is in the resting position, whereby the support member bears a portion of the weight of the ramp member.

7. The mobile loading dock of claim 1 wherein the ramp member includes two wheel assemblies, the two wheel assemblies being equally distant from a point on the lower edge.

8. The mobile loading dock of claim 1 further including a pair of rig hooks which hook onto trailer impact guards on a truck and act as a secondary securement device thereby preventing the truck from pulling away from the dock during loading or unloading.

9. The mobile loading dock of claim 8 wherein the rig hooks wrap onto and around an inside portion of the trailer impact guards.

\* \* \* \* \*